(12) United States Patent
Tsubouchi et al.

(10) Patent No.: US 6,442,992 B2
(45) Date of Patent: Sep. 3, 2002

(54) HOLLOW RACK SHAFT AND METHOD OF MANUFACTURING THE SAME

(75) Inventors: Akira Tsubouchi; Kiyoshi Okubo; Yasushi Watanabe, all of Maebahshi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/775,124

(22) Filed: Feb. 1, 2001

(30) Foreign Application Priority Data

Feb. 10, 2000 (JP) .................................... 2000-033684
Mar. 8, 2000 (JP) .................................... 2000-063974

(51) Int. Cl.$^7$ ............................................. B21K 1/54
(52) U.S. Cl. ......................... 72/370.21; 29/893.34; 74/457
(58) Field of Search ................... 72/370.04, 370.21, 72/398, 400, 401, 414; 29/893.32, 893.34; 74/457

(56) References Cited

FOREIGN PATENT DOCUMENTS

| JP | 58-218339 A | 12/1983 |
|---|---|---|
| JP | 4-28582 B2 | 5/1992 |
| JP | 5-345231 A | 12/1993 |
| JP | 6-246379 A | 9/1994 |
| JP | 11-180318 A | 7/1999 |
| JP | 11-278287 A | 10/1999 |

*Primary Examiner*—Lowell A. Larson
(74) *Attorney, Agent, or Firm*—Sidley Austin Brown & Wood LLP

(57) ABSTRACT

In a method of manufacturing a hollow rack shaft, an approximately rectangular plate having a wide rack tooth portion, is bent lengthwise into a gutter-like cross section to provide: at the central portion, a flat bottom portion on which rack teeth are formed later and a pair of mutually facing leg portions, and, in the vicinity of both ends, a semicircular bottom portion and a pair of mutually facing leg portions. The mutually facing leg portions at the central portion have a larger clearance than the clearance of the mutually facing leg portions in the vicinity of both ends. The rack teeth are then formed on the flat bottom portion through the plastic flow of the flat bottom portion and a part of material of the pair of leg portions of this flat bottom portion. The gutter-shaped plate, on which the rack teeth have been formed, is then formed into a tube having a hollow inner surface, by bending the plate and butt joining the edge portions.

14 Claims, 12 Drawing Sheets

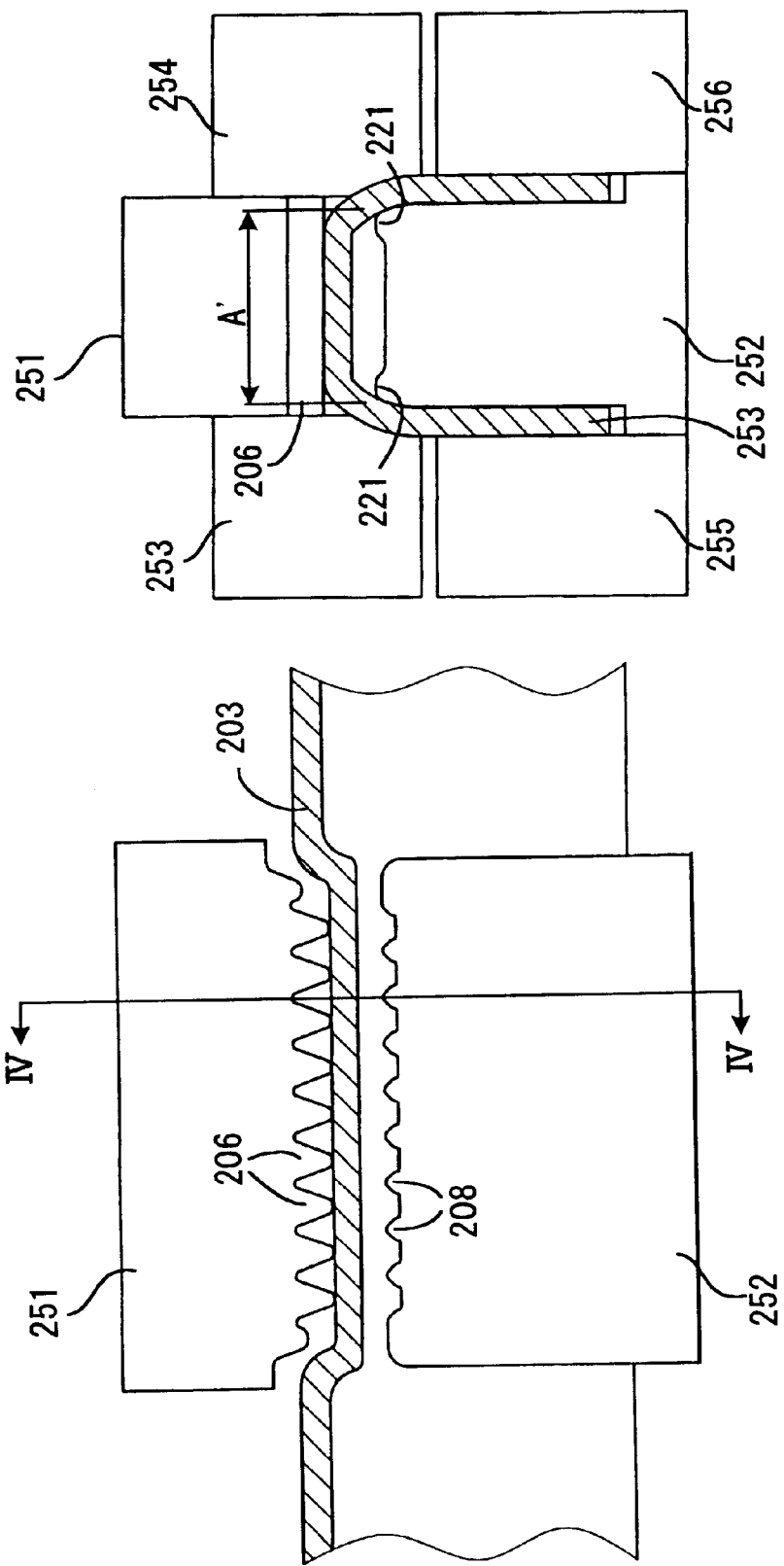

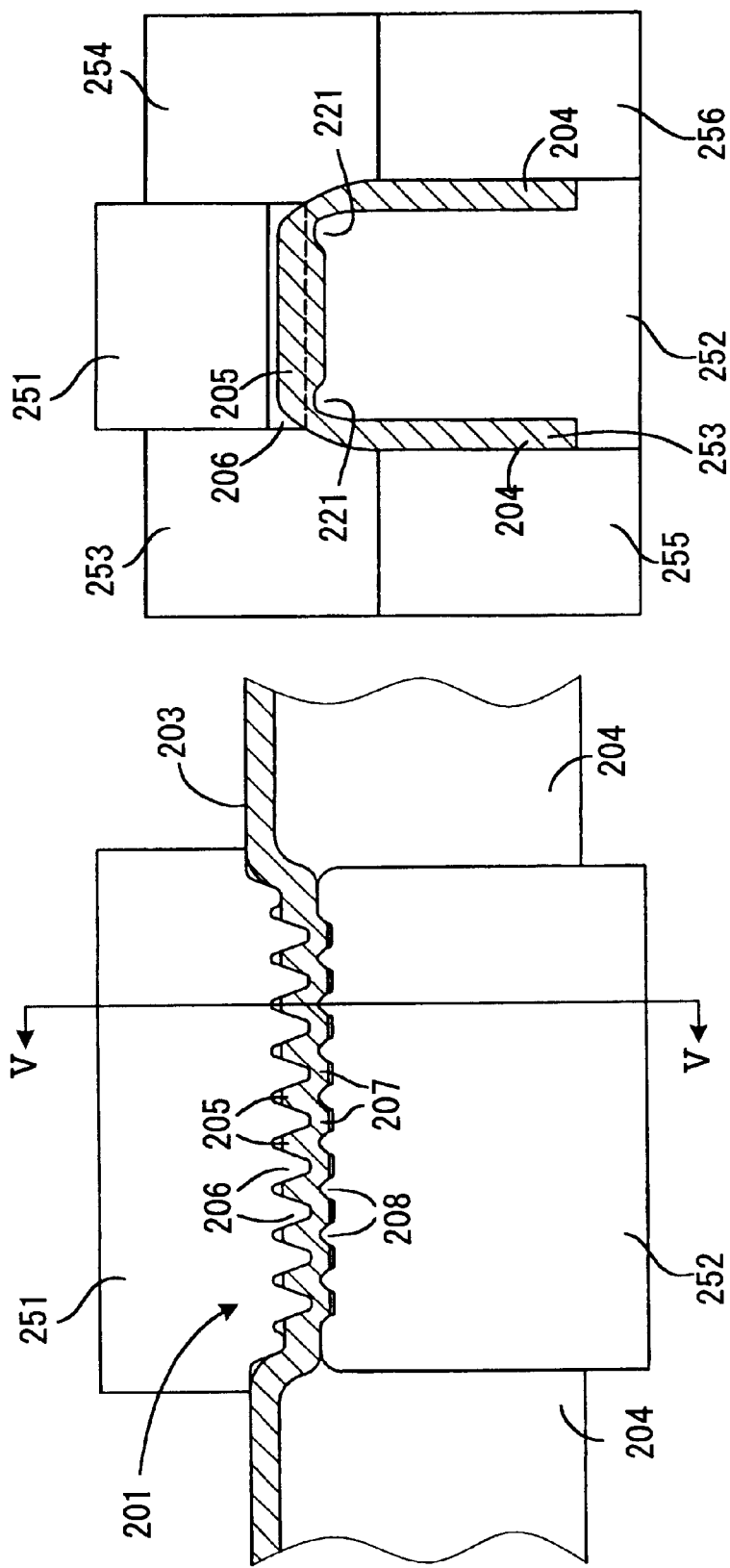

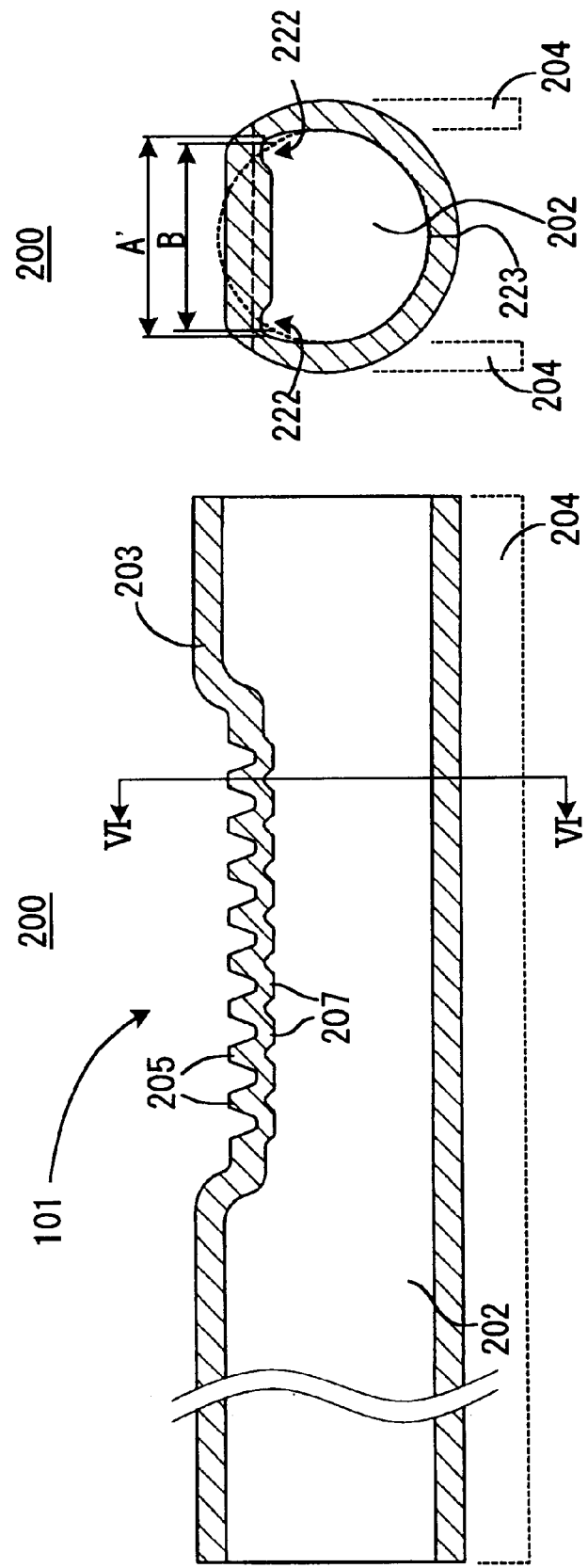

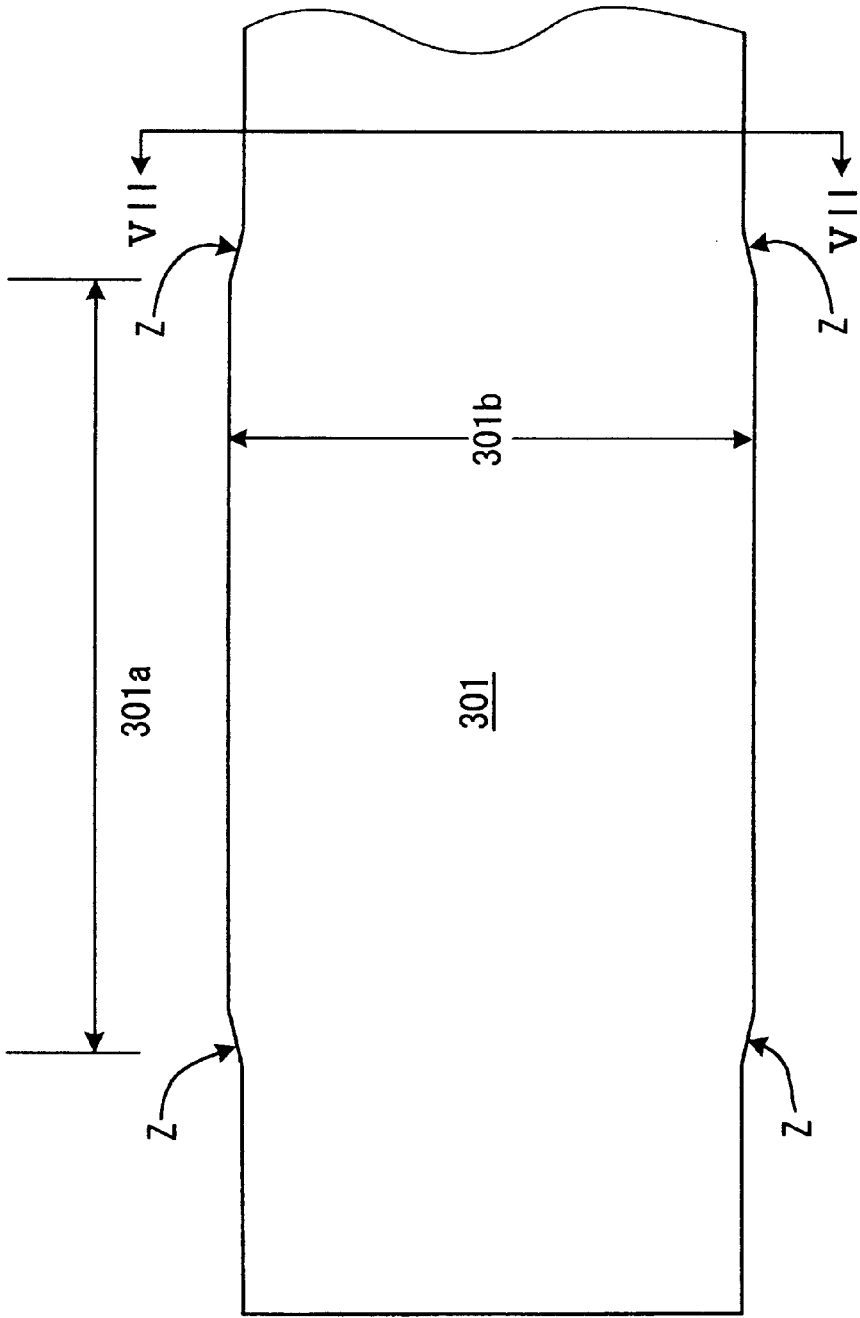

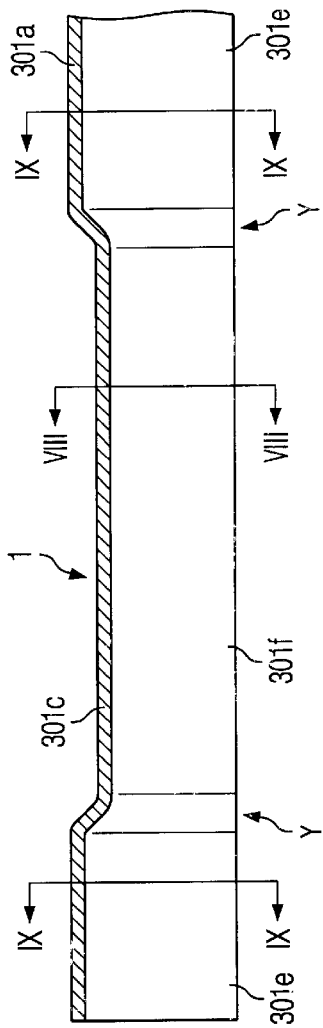
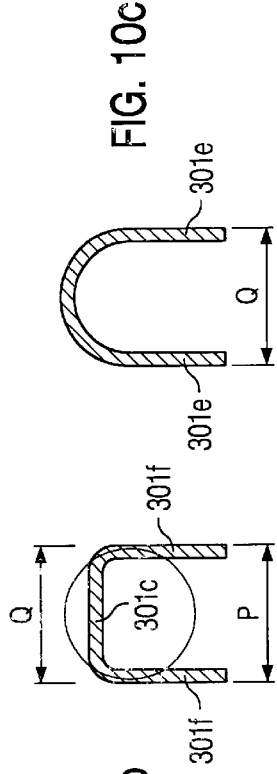
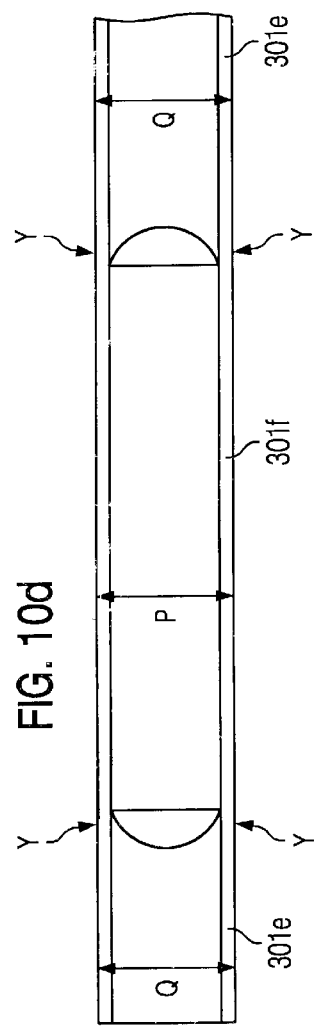
FIG. 10a
FIG. 10b
FIG. 10c
FIG. 10d

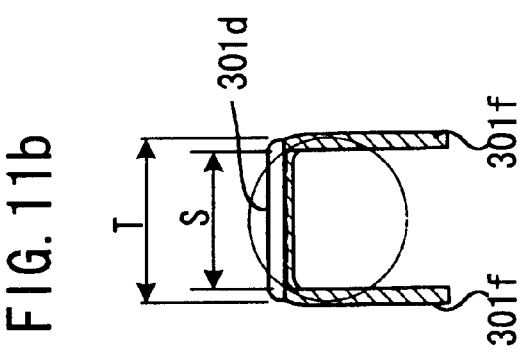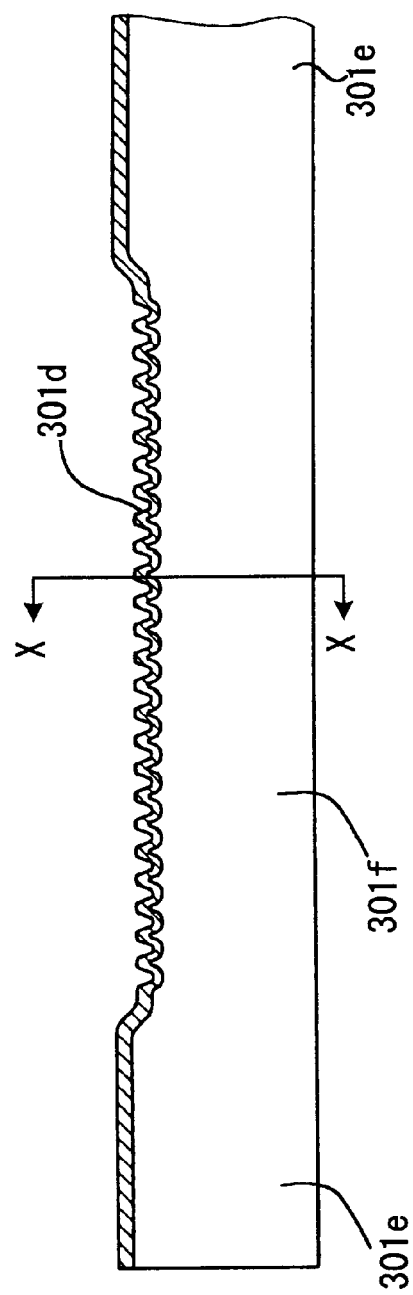

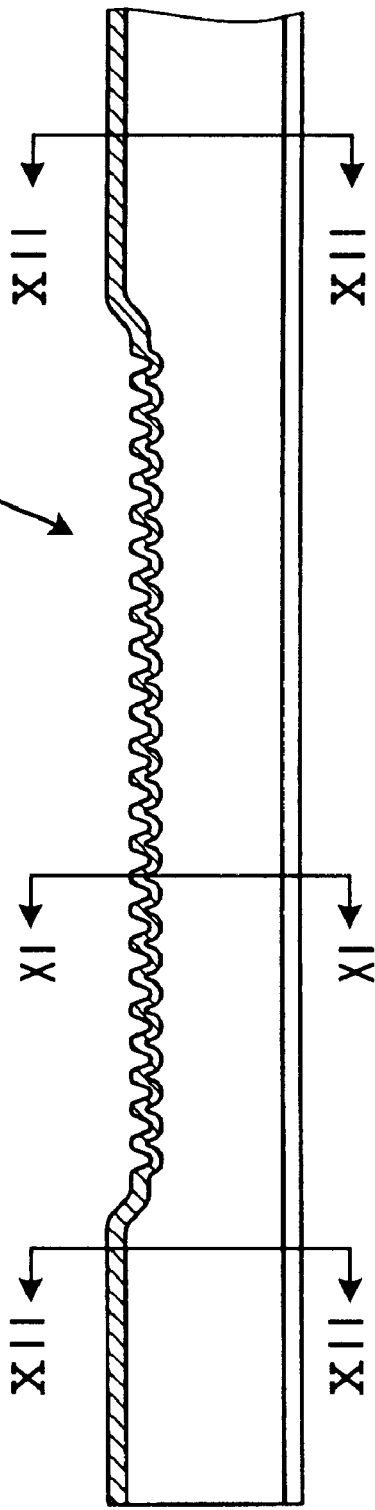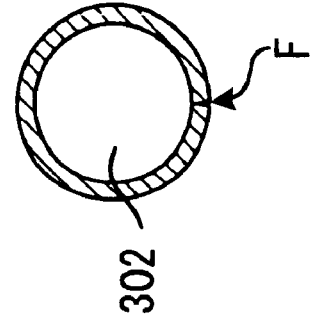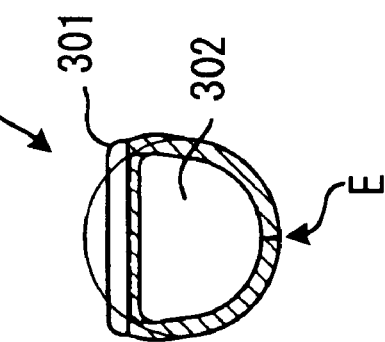

HOLLOW RACK SHAFT AND METHOD OF MANUFACTURING THE SAME

The present invention is based on Japanese Patent Applications No. 2000-033684 and No. 2000-063974 filed in Japan, the contents of which are hereby incorporated by reference.

BACKGROUND OF THE INVENTION

1. Field of the Invention

The present invention relates to a hollow rack shaft and, more particularly, to a hollow rack shaft for a steering system used in automobiles.

2. Description of Related Art

As the steering system for automobiles, a rack and pinion steering system is most frequently adopted. According to this rack and pinion steering system, when a steering wheel is turned by a driver, the rotation of this steering wheel is transmitted to a pinion. The rotation of the pinion is then transmitted to a rack shaft in mesh with the pinion, with the rotary motion being converted into a lateral (in the longitudinal direction of the rack shaft) motion. Because the rack shaft is connected to a steering rod, the direction of the front wheels is changed by the lateral motion of the rack shaft. The steering mechanism of this type is a known art and therefore will not be further explained.

The conventional rack shaft has been manufactured by gear cutting on a rod-like material. Recently, however, there has been the tendency for a rack shaft to be light-weightized in order to improve automotive fuel efficiency. In Japanese Patent Laid-Open Nos. Hei 06-246379, Sho 58-218339, and Hei 11-180318, methods of manufacturing the rack shaft have been disclosed.

According to the method of manufacturing the rack shaft disclosed in Japanese Patent Laid-Open No. Hei 6-246379, a tubular workpiece is inserted into a first split die, and the tublar workpiece is pressed by a primary press-forming process. Then the primary formed material is inserted into a second split die having the teeth on a part of the inner surface correspondingly to the rack teeth. Finally a semi-circular mandrel is pressed in from one end to thereby form the rack teeth.

The method of manufacturing the rack shaft disclosed in Japanese Patent Publication No. Sho 58-218339 involves inserting a mandrel into the tubular workpiece, and under the state that the tubular workpiece is surrounded by a stationary die, a second die having teeth corresponding to the rack teeth is pressed to the outside of the tubular workpiece, to thereby form rack teeth.

The method of manufacturing disclosed in Japanese Patent Laid-Open No. Hei 11-180318 is a technique invented by Okubo, one of inventors of the present invention. According to this method of manufacturing, an approximately rectangular plate is bent into a gutter shape along a longitudinal center. The gutter-shaped member has a flat bottom formed at the central part, and on both ends is provided a semi-circular shape with leg portions. On the flat bottom-shaped central part the rack teeth are formed through a plastic working process. Thereafter, the leg portions of the central part and the leg portions of both ends are bent into the form of a tube to thereby form a rack shaft.

In the technique of the first two patent documents described above, the tubular workpiece is used as a raw material, while in the latter technique a plate is used in place of the tubular workpiece. Therefore, not only is the invention advantageous in material cost, transportation cost and storage cost, but it has the merit which can achieve a substantial weight reduction effect without adding material to a portion other than the rack teeth in order to secure the thickness of the bottom section of the rack teeth.

The rack shaft is required to be compact and to withstand a great deal of load. This requirement is achievable by increasing the width of the rack teeth without increasing the whole body of the rack shaft.

In prior art methods, however, a tubular workpiece is used. Therefore, it is substantially impossible to manufacture the rack shaft in such a manner that the tooth width will exceed the size of the chord which crosses the outer periphery of the tubular workpiece (tube). That is, in the method disclosed in Japanese Patent Laid-Open No. Hei 6-246379, when the tubular workpiece is forced into the die correspondingly to the rack teeth by the use of a mandrel, a small-diameter mandrel is pressed into a narrow tubular workpiece. Therefore, the diameter of the mandrel is limited in size and accordingly a rack having a large tooth width cannot be formed.

In the method disclosed in Japanese Laid Open Publication No. Sho 58-218339 (Examined Japanese Patent Publication No. Hei 4-28582), the die having teeth corresponding to the rack teeth is pressed on the tube to thereby forge the rack teeth. At this time, since the workpiece is upset in the direction of the center axis, it is almost impossible to increase the tooth width.

These two methods of manufacture have such a drawback that the inner side (the inner surface of the hollow section) of the rack teeth is flat, and therefore the tooth bottom section will decrease in thickness and strength compared with the other portion. Besides, these methods also have the drawback that it becomes necessary to add excess material to the other portion in case the metal thickness of the tooth bottom is to be assured, as a result a sufficient weight reducing effect cannot be obtained.

The above-described problem can be solved to some extent by the method of manufacture disclosed in Japanese Patent Laid-Open No. Hei 11-180318 described above, which, however, is still insufficient for the following reason.

Referring to FIGS. 1–5, in the latter method of manufacturing the hollow rack shaft, a gutter-shaped workpiece 103 (FIGS. 3a and 3b), having a flat central portion and a semi-circular portion with legs on both ends, is used. A rack portion 101 (FIG. 4a) is formed in the flat bottom section of the workpiece 103. To form the rack portion 101, an upper die 151, having a complementary shape (the tooth 106) of the rack tooth form in the lower part, and a lower die 152, having the inner side shape (the tooth 108) of the rack tooth form in the upper part, are used. Between these dies, the flat bottom section of the workpiece 103 is placed (FIGS. 3a and 3b). The workpiece is then press-formed by letting the upper die 151 down. On the sides of the upper die 151 and the lower die 152, pressure plates 153, 154, 155, and 156, to support workpiece 103 from the sides, are provided, as shown in FIG. 3b.

As shown in FIG. 2a and FIG. 2b, the width B of the lower surface 107 of the tooth bottom section of the rack 101 in the hollow section 102 of the hollow rack shaft is the length of the chord geometrically determined by the radius R of the hollow section 102, tooth bottom position X, and plate thickness t of the rack tooth bottom. In a conventional rack and pinion steering system, the width A of a portion 108 to form the teeth of the lower die 152 has been designed to be the same size as the width B. In this type, the position X of the booth bottom requires to be more than a given amount in order to maintain the bending strength of the hollow rack shaft 100; therefore it is impossible to lower the position X (or X-t) to the vicinity of the center of the hollow portion 102. Therefore the width B must be made substantially smaller than the diameter (2R) of the hollow portion 102, and accordingly the rack tooth width could not be increased.

Furthermore, it has been understood that when the lower die 152 stated above is used, the effective tooth width C of the rack teeth 105 (the tooth width in the pitch surface of the rack teeth 105) is worked narrower than intended. A reason for the above-described drawback will be explained below. FIG. 5 is a view for explaining where the material of the workpiece 103 in the region of the flat bottom section before the forming of the rack teeth 105 transfers after the forming of the rack teeth 105. At the center of the rack teeth 105, the material within the region A7 has moved to the region a7, while the material within the region A8, to the region a8. In the meantime, near the end of the rack teeth 105 the material within the regions A1 to A6 has moved to the regions a1 to a6 respectively. The material that has moved as far as the vicinity of the end of the rack teeth 105 during the forming of the rack teeth 105 is stretched much wider than the material at the central part of the rack teeth 105, being spread to a wide area. That is, because the rack teeth 105 are formed in the flat bottom section, the plate thickness of the workpiece 103 in the vicinity of the end of the rack teeth 105 is decreased more than that in the central part of the rack teeth 105, resulting in a decreased effective tooth width C as indicated by the enclosure E of FIG. 4a (a sectional view taken along line III—III in FIG. 4a), and in FIG. 5. The decrease in the effective tooth width C will increase a load on the tooth face, resulting in a fracture of the rack teeth 105 or a shortened life of the hollow rack shaft 100.

It may be proposed to increase a pressure to be applied to the upper die 151 and the lower die 152, to thereby allow the flow of the material from the central part to the vicinity of the end of the rack teeth 105. This method, however, will exert a great deal of load to the teeth 108 of the dies 151 and 152, substantially, therefore, it is impossible to adopt this method. In case this method is adopted, there will arise the problem that the upper die 151 and the lower die 152 will considerably decrease in life.

Furthermore, when the decrease in the effective tooth width C of a product (the hollow rack shaft) is accepted, there will occur such a shortcoming that the user will have some doubts about the reliability of the product even if the product has none of such problems as deteriorated tooth face accuracy and function of a gear transmission, a fracture of the rack teeth 105, and shortened life of the hollow rack shaft 100.

SUMMARY OF THE INVENTION

According to the hollow rack shaft and the method of manufacturing the hollow rack shaft of a first embodiment of the present invention, the hollow rack shaft is formed from a plate in order to obtain a sufficient tooth width even in the vicinity of the end of the rack teeth, thereby providing the rack teeth with a sufficiently wide tooth width and consequently reducing a load per unit surface area of each rack tooth face. Therefore, it is possible to prevent damage to the rack teeth, thereby enabling the prolonging of the life of the rack shaft. Furthermore, because of the provision of the sufficiently large rack tooth width, the user will have no doubts about the reliability of the rack shaft product.

Furthermore, in the hollow rack shaft of the first embodiment, the width of rack teeth on the hollow inner surface side at the cross section at right angles to the axis of the hollow rack shaft is wider than the width geometrically determined by such dimensions as the inside diameter of the hollow rack shaft, the position of the rack tooth bottom, and the plate thickness of the rack tooth bottom.

Furthermore, each tooth of the hollow rack shaft of the first embodiment is formed to have a greater formation at both ends in the direction of the tooth trace than the central portion.

Furthermore, when each tooth of the hollow rack shaft of the first embodiment is formed, the flat bottom section of the workpiece is formed by a press-forming process by the use of a die which is wider than the width of the flat bottom section.

The tooth of the die is recessed at the central portion and provided with projections on both end portions, thereby providing a greater formation at both end portions of the tooth to be formed than the central portion.

Furthermore, according to another method of manufacturing the hollow rack shaft in accordance with a second embodiment of the present invention, an approximately rectangular plate which has been shaped wide at the rack tooth portion formed in post-process is bent lengthwise into a form having a gutter-shaped cross sectional form. At this time, at its center portion the bent plate has a flat bottom section on which the rack teeth are to be formed and a pair of mutually facing leg portions, and each of the end portions also has the semi-circular bottom section with a pair of mutually facing leg portions. The mutually facing leg portions at the center have a larger spacing than the spacing between the mutually facing legs in the vicinity of both end portions. Rack teeth are formed on the flat bottom section through the plastic flow of the flat bottom section and a part of the material of the pair of leg portions of the flat bottom section. The bent plate on which the rack teeth have been formed is bent further at the leg portions until their edges are butted, thus forming a hollow tube-like rack shaft.

Other objects and advantages besides those discussed above shall be apparent to those skilled in the art from the description of preferred embodiments of the present invention which follows. In the description, reference is made to accompanying drawings, which form a part thereof, and which illustrate examples of the present invention Such examples, however, are not exhaustive of various embodiments of the present invention, and therefore reference will be made to the claims which follow by the description for determining the scope of the present invention.

BRIEF DESCRIPTION OF THE DRAWINGS

The accompanying drawings, which are incorporated in and constitute a part of the specification, illustrate embodiments of the present invention and together with the description, serve to explain the principles of the present invention.

FIG. 3a is a front sectional view of the workpiece 103, and FIG. 3b is a sectional view taken along line II—II in FIG. 3a.

FIG. 4a is a front sectional view of the workpiece 103, while FIG. 4b is a sectional view taken along line III—III in FIG. 4a (a sectional view cut at the tooth top portion of the rack teeth 105 of the rack portion 101).

FIG. 6a and FIG. 6b show the rack teeth in the forming process by the method of manufacture of the first embodiment of the present invention. Here, FIG. 6a is a front sectional view showing a workpiece immediately before rack tooth forming, while FIG. 6b is a sectional view taken along line IV—IV of FIG. 6a (a sectional view cut at the tooth top portion of the rack).

FIG. 7a and FIG. 7b show the rack teeth in the forming process by the method of manufacture of the first embodiment of the present invention. Here, FIG. 7a is a front sectional view showing a workpiece immediately after the rack tooth forming, and the used die. FIG. 7b is a sectional view taken along line V—V of FIG. 7a (a sectional view cut at the tooth top portion of the rack).

FIG. 8a and FIG. 8b show the rack shaft of the present invention that has been formed through a tube working by the method of manufacturing and the subsequent process of the first embodiment of the present invention. Of these drawings, FIG. 8a is a sectional view of the rack shaft, and FIG. 8b is a sectional view (a sectional view cut at the tooth top portion of the rack) taken along line VI—VI of FIG. 8a.

FIG. 9a is a plan view showing the plate used in the second embodiment.

FIG. 9b is a sectional view taken along line VII—VII of FIG. 9a.

FIGS. 10a, 10b, 10c and 10d show a plate 310 of the second embodiment after forming by the first process. FIG. 10a shows a front sectional view of the formed plate 301. FIG. 10a shows a sectional view taken on line VIII—VIII of FIG. 10a. FIG. 10c is a sectional view taken along line IX—IX of FIG. 10a. FIG. 10d is a bottom view of FIG. 10a.

FIGS. 11a and 11b show the rack teeth 301d formed through the later-described second process (the second embodiment), being a front sectional view of the plate 301 after the formation of rack teeth and a sectional view taken along line X—X in FIG. 11a respectively.

FIGS. 12a, 12b, and 12c are views (the second embodiment) showing the state of a workpiece that has passed through the third process, being a front sectional view, a sectional view taken along line XI—XI of FIG. 12a, and a sectional view taken along line XII—XII of FIG. 12a respectively.

FIG. 13 is an enlarged sectional view taken along line XI—XI of FIG. 12a.

DESCRIPTION OF THE PREFERRED EMBODIMENTS

Figure 1:
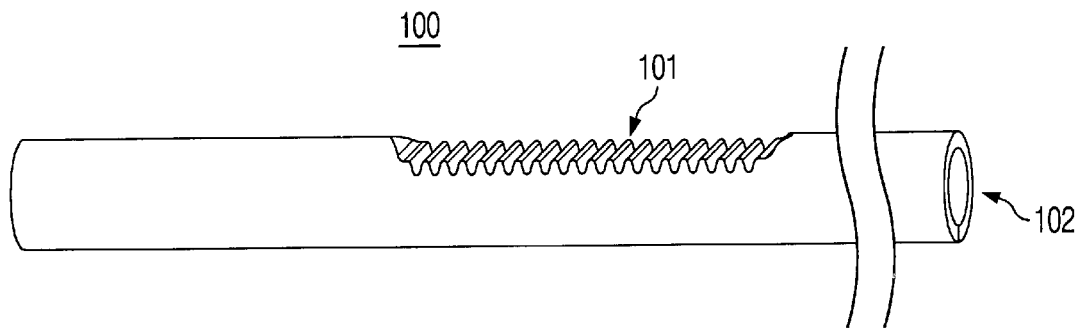
FIG. 1 is a general perspective view showing a hollow rack shaft 100 formed through a conventional method of manufacture.
Figure 5:
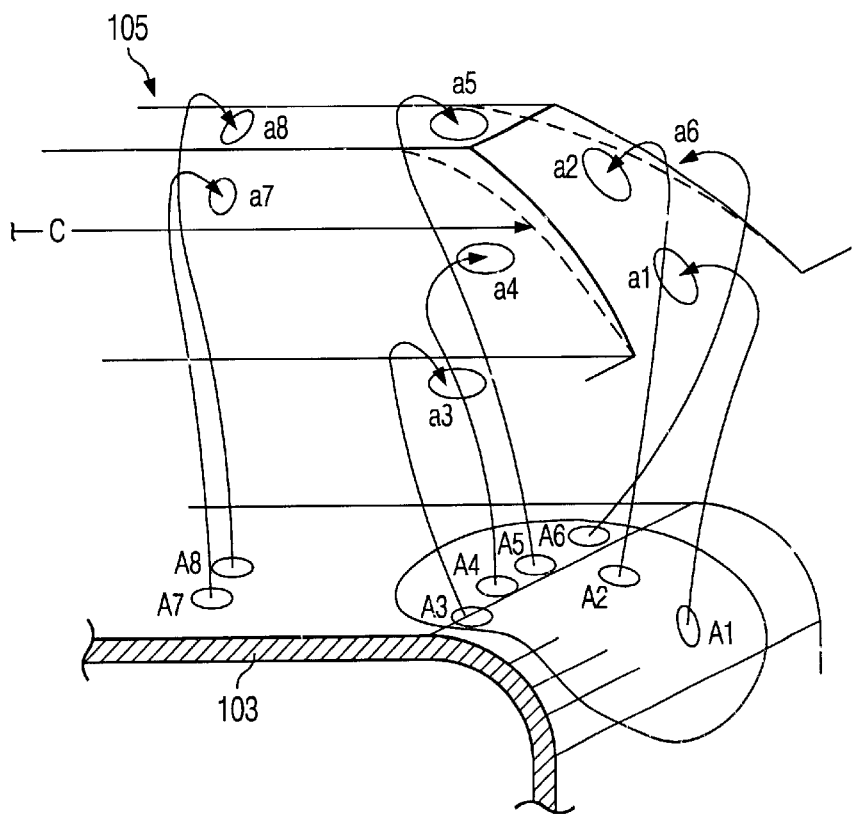
FIG. 5 is an explanatory view explaining how the material at the flat bottom section of the workpiece 103 flows during the tooth forming in the conventional technology.
Figure 2B:
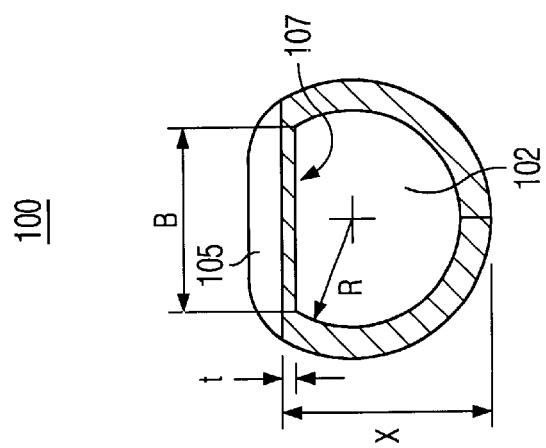
FIG. 2a and FIG. 2b are a front sectional view and a cross sectional view respectively of the hollow rack shaft 100.
Figure 2A:
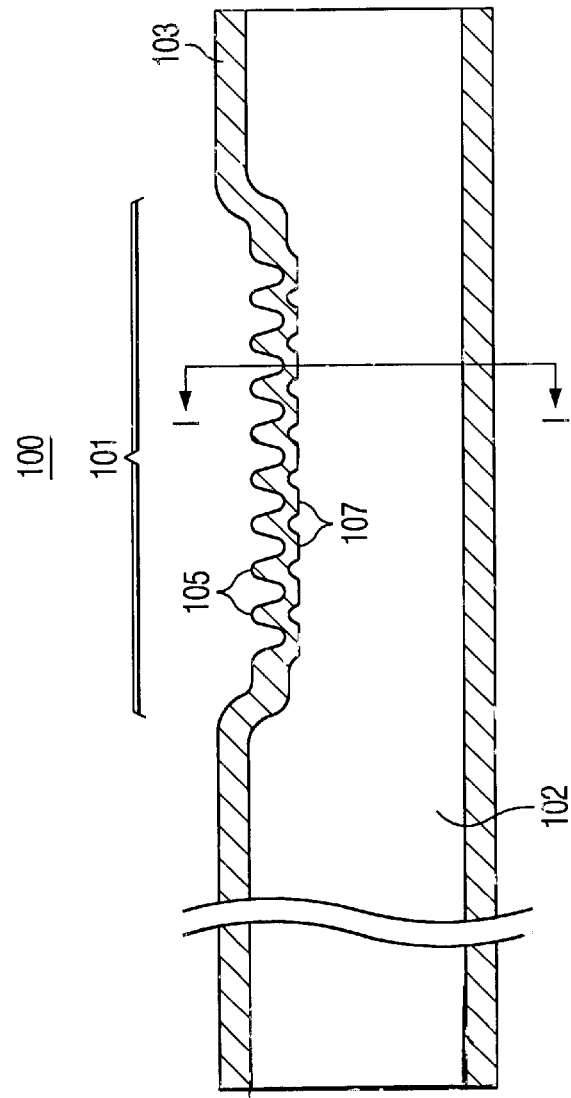
Figure 3B:
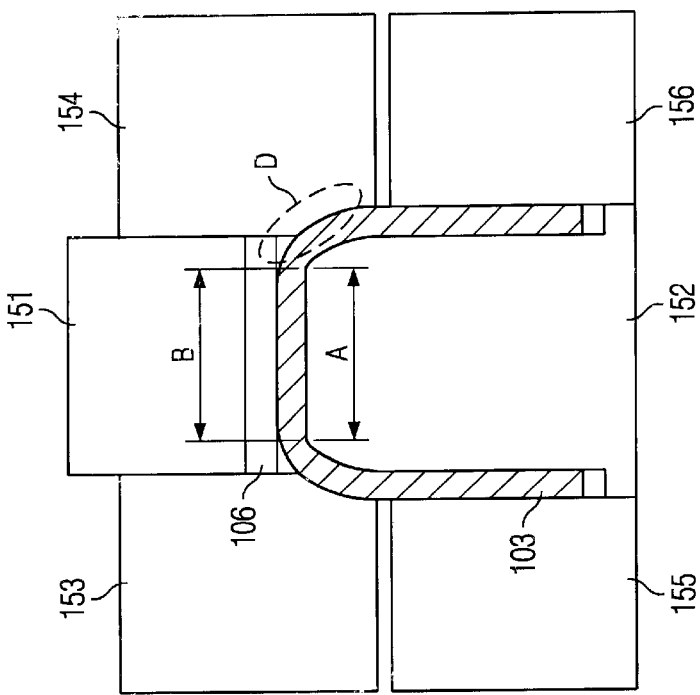
FIG. 3a and FIG. 3b are sectional views showing a workpiece 103 immediately before the forming of the rack portion 101 by the use of a die, and the used die. Of these drawings.
Figure 3A:
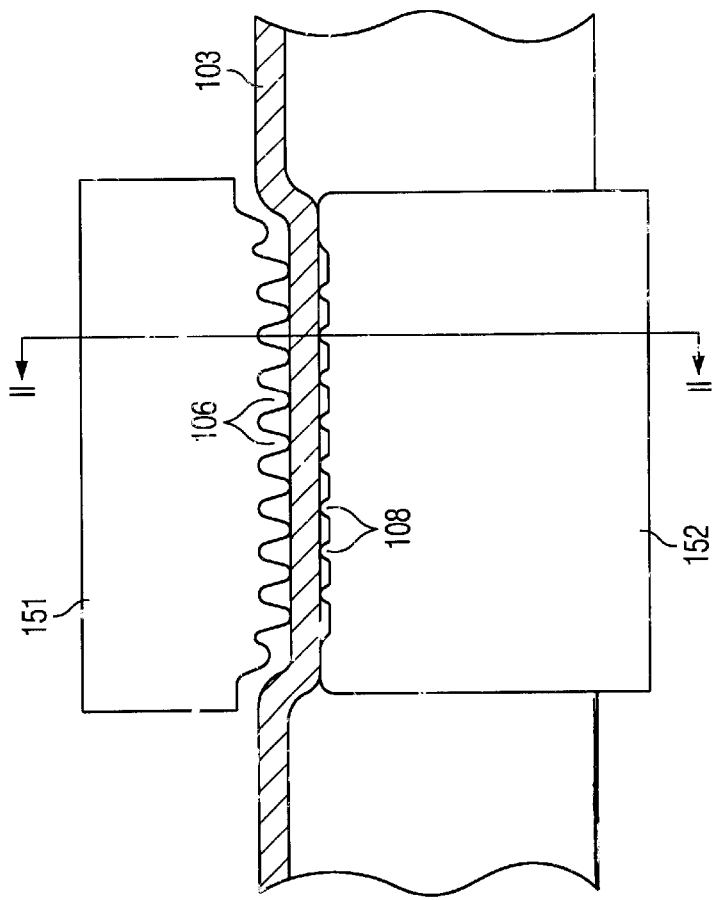
Figure 4A:
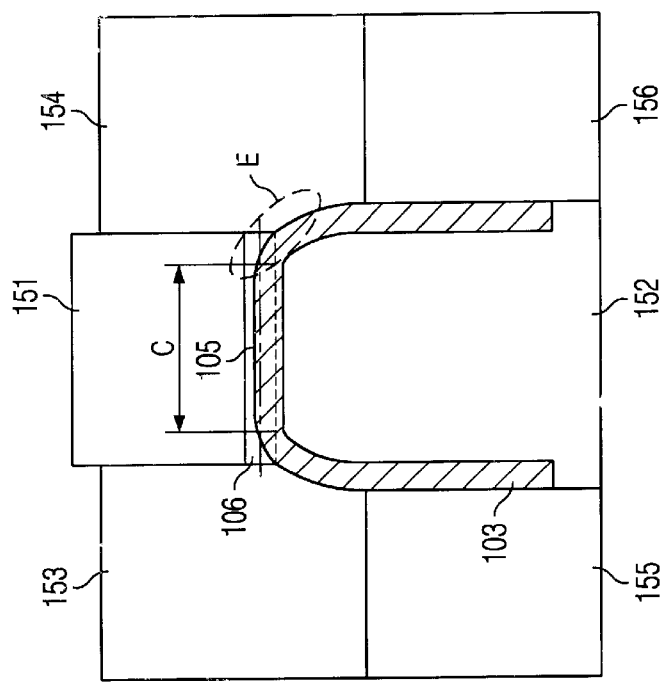
FIG. 4a and FIG. 4b are sectional views showing the workpiece 103 immediately after the forming of the rack portion 101 by the conventional technology, and the used die. Of these drawings.
Figure 4B:
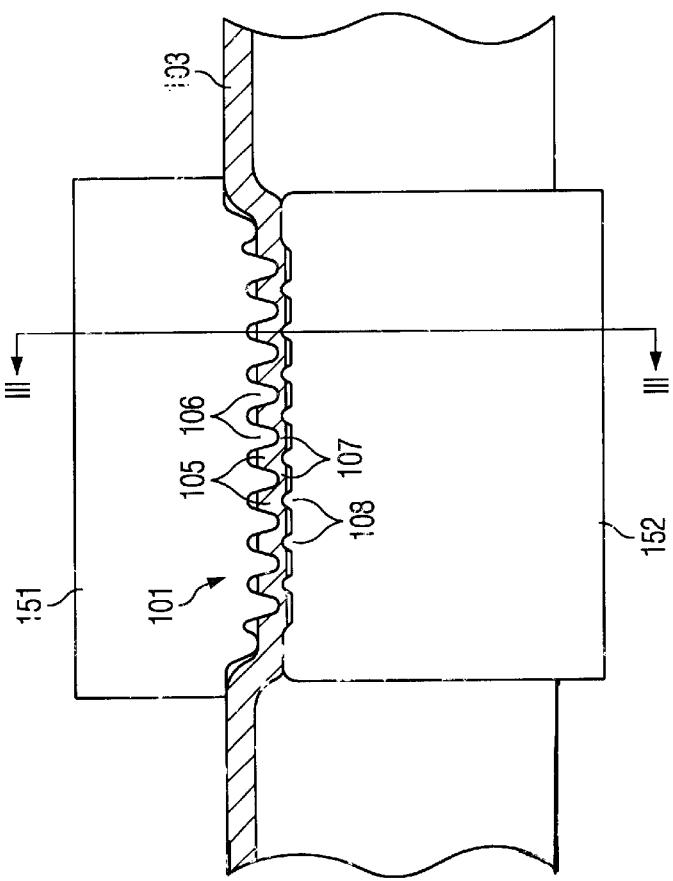

Now, preferred embodiments of the present invention will be described in detail while referring to the accompanying drawings.

The First Embodiment

According to the method of manufacturing the hollow rack shaft of the first embodiment, a gutter-shaped workpiece 203 is formed in a semicircular shape, which has a flat bottom at the central portion and leg portions on both sides. A rack portion 201 is press-formed on the flat bottom section of the workpiece 203. To press-form the rack portion 201, the flat bottom portion (FIGS. 6a and 6b) is placed between an upper die 251 having, on the underside, a complementary shape (the tooth 206) like the rack tooth shape and a lower die 252 having, on the outer side, the same form as the inner side of the rack tooth portion (the tooth 208). The upper die 251 is moved downwardly to press-form the workpiece 203. On the side surface of the upper die 251 and the lower die 252 are provided holders 253, 254, 255 and 256 for holding the workpiece 203 from both sides. The method of manufacture of the present invention is the same in this respect as conventional ones.

On the upper surface of the lower die 252 a couple of projections 221, which are higher than the vicinity of the center of the tooth width as its sectional shape shown in FIG. 6b, are formed. The length A' between the outer edges of these two projections 221 is greater than the width B (FIG. 8b) of a portion corresponding to the tooth bottom portion of the inner rack teeth (the hollow portion side on the inner side of the rack tooth portion).

The feature of the first embodiment of the present invention is that the lower die 252 is provided with the projections 221.

In the first embodiment, as shown in FIG. 7a and 7b, the projections 221 are designed to push up the material of the workpiece 203 from below, and therefore the material is forced to positively flow to other portions, thus being filled to all the tooth surface of the upper die 251. That is, because both end portions of the rack teeth in the direction of tooth width is formed stronger than the central portion of the tooth width by the projections 221 of the lower die 252, it is possible to form the rack teeth of the effective tooth width C as initially designed.

Subsequently, the workpiece 203, on which the tooth shape has been formed to the ends of the tooth width, is bent at the open leg portions (FIG. 8b) until these leg portions are butt-joined into the form of a tube, that is, a hollow portion 202. A butt portion 223 is joined by welding, e.g. laser welding, and furthermore is finished to thereby complete the hollow rack shaft product. The hollow rack shaft appears almost the same as a conventional hollow rack shaft shown in FIG. 1, but the hollow rack shaft product of the first embodiment, as shown in FIG. 8b, is provided with recesses 222 formed in the inner surface of the hollow portion 202 by the projections 221 of the lower die 252.

The Second Embodiment

A hollow rack shaft 300 (FIG. 14), as shown in FIG. 9a and FIG. 9b, is produced of an approximately rectangular plate 301. The approximately rectangular plate 301 is made by blanking or laser-cutting. The material to be used is SCr or SCM that can be carburized or a carbon steel suitable for induction hardening. The plate 301 has a wide portion 301a in the plate width 301b portion as shown in FIG. 9a. The portion 301a having this wide portion 301b is a region required for forming rack teeth, being shaped wider than other portions to provide the finished rack teeth with a larger width. The plate 301 is bent into a gutter form by a press forming in the first process.

The plate 301 bent into the gutter form in the first process has a semi-circular bottom surface and a pair of leg portions 301e as shown in FIG. 10c in the portion 301b where no rack teeth are formed in the later process. The portion 301c on which the rack teeth are formed in the later process has a flat bottom and a pair of leg portions 301*f* as shown in FIG. 10*b*. The leg portion 301*e* and the leg 301*f* are smoothly joined at the boundary Y. The leg portion 301*f*, as shown in FIG. 10*d*, is provided with a wider space P than the space Q of the leg portion 301*e* (P>Q) for the purpose of providing a large rack tooth width.

In the first process, the product can be made either by one process or by separate processes if the capacity of equipment is limited; that is, the rack shaft may be formed by an ordinary bending process; no special working technology is needed.

The second process is similar to Japanese Patent Laid-Open No. Hei 11-180318 except for the following point. The upper and lower dies used in forming the rack teeth in this process have sufficiently wide tooth width comparable to the tooth width of a finished product. With the forming of the rack teeth 301*d*, a deformation is also made simultaneously in order that the space P of the pair of leg portions 301*f* (FIG. 10*d*) will be equal to the space Q of the pair of leg portions 301*e*. In this deformation, the material of the leg portions 301*f* partly flows into the rack teeth 301*d*, thereby making up the material of the rack teeth 301*d*.

That is, in the second process, the plate 301 coming from the first process is held between the upper die having a wide tooth width corresponding to that of the rack tooth portion and the lower die having wide teeth corresponding to the teeth of the upper die, then these dies are moved closer to each other to thereby form the rack teeth 301*d* while admitting the flow of a part of the material of the leg portions 301*f* to the rack teeth 301*d*. The second process can be accomplished through a plurality of pressing processes (multiple-stage processes) with changing of the combination of dies used.

Figure 13:
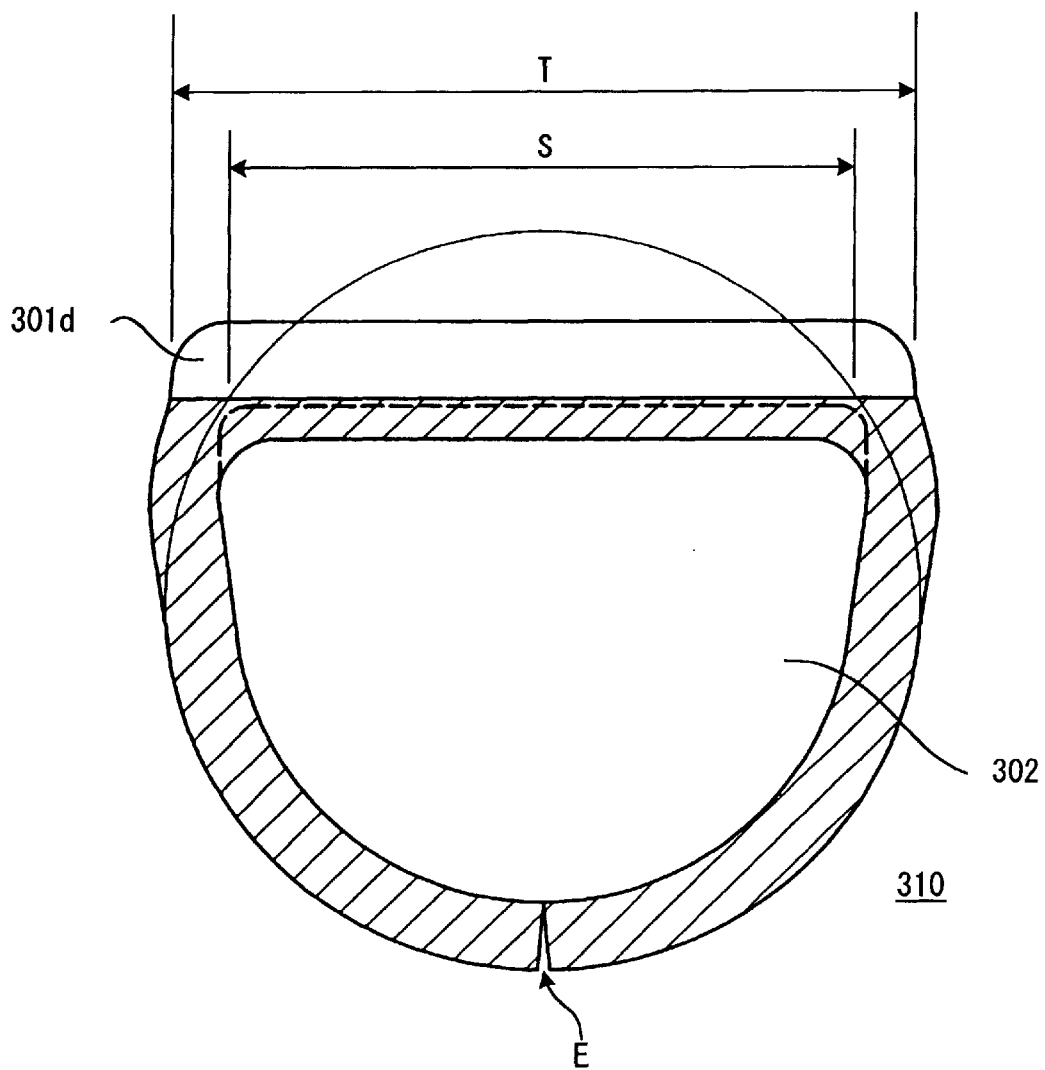

The rack teeth 301*d* have teeth shape not only on the outer surface side but on the inner side as shown in FIG. 11*a*. The present embodiment feature is that, as shown in FIGS. 11*b* and 13, the rack teeth 301*d* are formed to a larger tooth width T than the length S of the chord crossing the circle of the tube-shaped portion (to be formed by the subsequent process) in the vicinity of both ends of the rack shaft.

The provision of the tooth width T being larger than the length S of chord becomes possible because the plate 301 after the first process is gutter-shaped in the cross section of the plate 301, the leg portions 301*e* and the leg portions 301*f* open downwardly as shown in FIG. 11*b*, and through this opening the lower die can vertically approach the plate 301 without interference with the leg portions. Furthermore, as in the case that a tubular workpiece is used as the feedstock for the rack shaft, die insertion can be performed without space limitation because of the presence of the opening. Consequently it is possible to use the upper and lower dies of simple configuration and having a sufficiently great strength, thereby enabling relatively free design and easy manufacturing of dies. Besides, because split dies are usable, the die can easily be prevented from cracking by splitting the die at a position, particularly at a boundary of each tooth of the rack tooth portion, where a crack is likely to occur.

Because of the provision of the opening stated above, various methods of forming are applicable to forming the rack teeth, such as a method of simultaneously forming all the teeth of the upper die 251 and the lower die 252 of the first embodiment, a method of forming the teeth by splitting by each tooth or by a few teeth, a method of forming by passing the flat bottom portion of the workpiece 203 between a pair of mutually engaged spur gear-like rolling dies, and a rocking die forging method in which a segment gear-type die is rocked during operation. It should be noticed that the present invention is not limited by a specific method of rack tooth forming and is applicable to various methods of working.

Furthermore, the present invention is applicable also to the manufacture of a VGR (variable gear ratio) rack shaft. In the case of the VGR, the shape of the rack teeth is varied in the axial direction and accordingly the volume of the tooth portion also is varied in the axial direction. According to a conventional method, therefore, there arise difficulties in forming the tooth portion which has different volumes because of such a phenomenon as "overfill" in a small-volume portion or "underfill" in a large-volume portion. In the present invention, however, it is possible to prevent the overfill or underfill by adjusting the shape of the lower die for forming the inner side, and therefore the VGR tooth form can easily be formed.

In the third process, the leg portions of gutter shape 301*f* and 301*e* are bent and formed into a tube shape. At this time, the leg portions 301*e* are formed into one circle connected to the circular arc of the semi-circular bottom surface already formed, and the leg portions 301*f* are bent to the same diameter as this circle by preadjusting the plate width 301*b* (FIG. 9*a*) of the wider portion 301*a* of the plate 301. Furthermore, it is possible to substantially increase the strength of the finished hollow rack shaft 300 (FIG. 14) by connecting partly or fully along the butt portions E and F (FIGS. 12*b* and 12*c*) through a joining process such as the laser welding of the butt-joined portions E and F.

Figure 14:
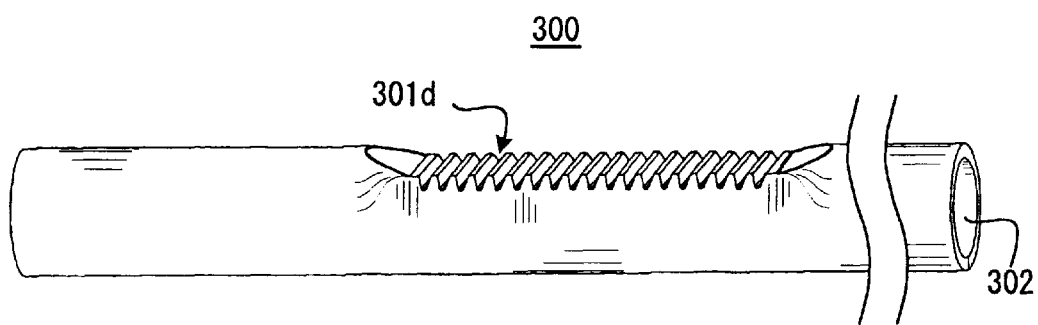
FIG. 14 is a perspective view of the hollow rack shaft made through the method of manufacturing according to the second embodiment.

The hollow rack shaft 300, formed thus, is subjected to cutting other than the rack portion after the welding of the butt-joined portions E and F when needed as described above, and then in the subsequent processes the hollow rack shaft 300 is further subjected to carburization or induction hardening of the rack portion and other portions for the purpose of providing required strength. Finally the shaft portion is finished by grinding. It is, of course, allowed to correct bending as required in the course of processing. FIG. 14 shows the hollow rack shaft 300 manufactured by the second embodiment.

According to the method of manufacture of the present embodiment, a low-cost, high-performance hollow rack shaft, particularly the hollow rack shaft for the steering system, can readily be manufactured. Furthermore, since the tooth width can be made larger than the length of chord crossing the outer periphery of the tube, it is possible to increase the load capacity of the tooth portion. Furthermore, since teeth are formable on both the outer and inner sides of the tooth portion, the plate thickness of the tooth portion can be formed relatively freely without decreasing the thickness of the tooth bottom portion. Furthermore, the use of a plate can reduce the manufacturing cost. The butt-joined portion of the tube can be joined by welding as needed. Furthermore, because both the upper and lower dies, used for forming the outer and inner teeth shape, are freely selectable, the dies having a desired tooth shape are freely selectable for use to form the VGR rack shaft. Furthermore, the upper and lower dies having sufficient strength can be designed. Furthermore, the rack teeth can be formed through the entire surface not only by a simultaneous forming process but by various forming methods as rolling and rocking die forging. And furthermore, it is possible to straighten the rack shaft by correcting a bend after tube forming.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A tubular rack shaft having a longitudinal axis, an inner tubular surface, and an outer tubular surface, said tubular rack shaft comprising:

first and second longitudinally extending tubular end portions;

a longitudinally extending tubular intermediate portion connecting said first and second tubular end portions, said intermediate portion having a longitudinally extending rack tooth portion plastically formed therein, said rack tooth portion comprising a rack tooth bottom having rack teeth extending transversely with respect to the longitudinal axis of the rack shaft;

wherein a portion of said inner tubular surface corresponding to the rack teeth has a width perpendicular to the longitudinal axis of the rack shaft which is greater than a width determined by inside radius R of the tubular rack shaft, position X of the inner tubular surface of the rack tooth bottom, and plate thickness t of the rack tooth bottom.

2. A tubular rack shaft according to claim 1, wherein portions of the inner tubular surface corresponding to ends of a respective rack tooth extend outwardly at both ends of the respective rack tooth more than does a portion of the inner tubular surface corresponding to a central portion of the respective rack tooth when viewed along the width of the respective rack tooth in a cross section cut at right angles with respect to the longitudinal axis of the tubular rack shaft.

3. A method of forming rack teeth by press-forming rack teeth on a gutter-shaped workpiece having a longitudinally extending intermediate portion joining first and second longitudinally extending end portions, wherein said longitudinally extending intermediate portion has a flat bottom portion and a pair of legs, and wherein each of said longitudinally extending end portions has a semi-circular bottom portion and a pair of legs, said method comprising the steps of:

press-forming rack teeth extending transversely of said flat bottom portion by inserting a die between the legs of said intermediate portion, and pressing said die against an inner surface of said flat bottom portion to form an inner side of said rack teeth, wherein said die has a larger tooth width of said rack teeth than a width of the flat bottom portion.

4. A rack tooth forming die for press-forming rack teeth on a gutter-shaped workpiece having a longitudinally extending intermediate portion joining first and second longitudinally extending end portions, where said longitudinally extending intermediate portion has a flat bottom portion and a pair of legs, and wherein each of said longitudinally extending end portions has a semi-circular bottom and a pair of legs, said method comprising the steps of:

press-forming rack teeth extending transversely of said flat bottom portion by inserting a die between the legs of said intermediate portion, said die having rack tooth forming portions, and pressing the rack tooth forming portions of said die against an inner surface of said flat bottom portion to form an inner side of said rack teeth;

wherein, each rack tooth forming portion has, in a direction of tooth width of a corresponding rack tooth, a recessed central portion defined by projections on both ends of the respective rack tooth forming portion, to thereby provide both ends of a resulting rack tooth in said flat bottom portion with an inner surface which projects outwardly more at ends of the respective resulting rack tooth than does a central portion of the inner surface of the respective resulting rack tooth.

5. A tubular rack shaft having a longitudinally extending intermediate portion joining first and second longitudinally extending end portions, wherein said longitudinally extending intermediate portion has rack teeth, wherein each of said first and second longitudinally extending end portions is a generally cylindrical tubular portion, and wherein said tubular rack shaft is manufactured through the following processes in order of mention:

a first process comprising bending an approximately rectangular plate, having a longitudinally extending intermediate portion joining longitudinally extending end portions, the longitudinally extending intermediate portion of said plate having a width which is greater than a width of either of said longitudinally extending end portions of said plate, to form a gutter-shaped workpiece having a longitudinally extending intermediate portion joining first and second longitudinally extending end portions, wherein the longitudinally extending intermediate portion of said workpiece has a flat bottom portion and a pair of mutually facing legs, wherein each of said longitudinally extending end portions of said workpiece has a semi-circular bottom portion and a pair of mutually facing legs, and wherein a distance between the mutually facing legs of the intermediate portion of said workpiece is greater than a distance between the mutually facing legs of each of the end portions of said workpiece;

a second process comprising press forming rack teeth extending transversely of said flat bottom portion by inserting a die between the legs of said longitudinally extending intermediate portion of said workpiece and pressing thus inserted die against an inner surface of said flat bottom portion to form an inner side of said rack teeth, and a third process comprising converting said workpiece, having rack teeth formed therein, into a tubular shape by bending each pair of legs of said workpiece so as to butt together their free longitudinal edges and joining the thus butted edges.

6. A tubular rack shaft according to claim 5, wherein hollows corresponding to a form of a rack tooth are formed on the inner surface of said flat bottom portion.

7. A tubular rack shaft according to claim 5, wherein thus butted and joined edges of each pair of legs are at least partly welded together.

8. A tubular rack shaft according to claim 5, wherein hollows corresponding to a form of a rack tooth are formed on the inner surface of said flat bottom portion, and wherein thus butted and joined edges of each pair of legs are at least partly welded together.

9. A tubular rack shaft according to claim 5, wherein a tooth width of each respective one of said rack teeth is larger than a length of a chord formed by a plane including said flat bottom portion and intersecting said tubular shape.

10. A tubular rack shaft according to claim 9, wherein hollows corresponding to a form of a rack tooth are formed on the inner surface of said flat bottom portion.

11. A tubular rack shaft according to claim 9, wherein thus butted and joined edges of each pair of legs are at least partly welded together.

12. A tubular rack shaft according to claim 9, wherein hollows corresponding to a form of a rack tooth are formed on the inner surface of said flat bottom portion, and wherein thus butted and joined edges of each pair of legs are at least partly welded together.

13. A method of manufacturing a tubular rack shaft having a longitudinally extending intermediate portion joining first and second longitudinally extending end portions, wherein said longitudinally extending intermediate portion has rack teeth, and wherein each of said first and second longitudinally extending end portions is a generally cylindrical tubular portion, said method of manufacturing comprising following processes in order of mention:

- a first process comprising bending an approximately rectangular plate, having a longitudinally extending intermediate portion joining longitudinally extending end portions, to form a gutter-shaped workpiece having a longitudinally extending intermediate portion joining first and second longitudinally extending end portions, wherein the longitudinally extending intermediate portion of said workpiece has a flat bottom portion and a pair of mutually facing legs, wherein each of said longitudinally extending end portions of said workpiece has a semi-circular bottom portion and a pair of mutually facing legs, and wherein a distance between the mutually facing legs of the longitudinally extending intermediate portion of said workpiece is greater than a distance between the mutually facing legs of each of the longitudinally extending end portions of said workpiece;
- a second process comprising press forming rack teeth extending transversely of said flat bottom portion by inserting a die between the legs of said longitudinally extending intermediate portion of said workpiece and pressing thus inserted die against an inner surface of said flat bottom portion to form an inner side of said rack teeth; and
- a third process comprising converting said workpiece, having rack teeth formed therein, into a tubular shape by bending each pair of legs of said workpiece so as to butt together their free longitudinal edges.

14. A method of manufacturing a tubular rack shaft according to claim 13, further comprising joining the thus butted edges.

* * * * *